US009475065B2

(12) United States Patent
Ilmasti

(10) Patent No.: US 9,475,065 B2
(45) Date of Patent: Oct. 25, 2016

(54) DEVICE AND METHOD FOR PURIFYING AIR FROM NON-DESIRED COMPONENTS AND FOR ELIMINATING SUCH COMPONENTS

(75) Inventor: Veikko Ilmari Ilmasti, Helsinki (FI)

(73) Assignee: AAVI TECHNOLOGIES LTD., Helsinki (FI)

( * ) Notice: Subject to any disclaimer, the term of this patent is extended or adjusted under 35 U.S.C. 154(b) by 677 days.

(21) Appl. No.: 13/977,816

(22) PCT Filed: Jul. 14, 2011

(86) PCT No.: PCT/FI2011/000037
§ 371 (c)(1),
(2), (4) Date: Jul. 1, 2013

(87) PCT Pub. No.: WO2012/095549
PCT Pub. Date: Jul. 19, 2012

(65) Prior Publication Data
US 2013/0269518 A1  Oct. 17, 2013

(30) Foreign Application Priority Data

Jan. 12, 2011  (FI) .................................... 20110007

(51) Int. Cl.
*B03C 3/14* (2006.01)
*B03C 3/014* (2006.01)
*B03C 3/16* (2006.01)
*B03C 3/38* (2006.01)
*B01D 47/06* (2006.01)

(52) U.S. Cl.
CPC ................ *B03C 3/014* (2013.01); *B03C 3/16* (2013.01); *B03C 3/383* (2013.01); *B01D 47/06* (2013.01); *B03C 2201/24* (2013.01); *B03C 2201/32* (2013.01)

(58) Field of Classification Search
CPC combination set(s) only.
See application file for complete search history.

(56) References Cited

U.S. PATENT DOCUMENTS

| 7,442,234 | B2 | 10/2008 | Ilmasti |
| 2003/0196552 | A1 | 10/2003 | Willey et al. |
| 2007/0163434 | A1 | 7/2007 | Ilmasti |

FOREIGN PATENT DOCUMENTS

| CN | 1057409 | 1/1992 |
| EP | 0808660 | 11/1997 |

(Continued)

OTHER PUBLICATIONS

International Search Report dated Oct. 27, 2011, corresponding to PCT/FI2011/000037.

*Primary Examiner* — Duane Smith
*Assistant Examiner* — Adam W Bergfelder
(74) *Attorney, Agent, or Firm* — Young & Thompson

(57) ABSTRACT

A device for purifying air from non-desired gases and particles, in the case of nuclear power plants from radiating particles and gaseous iodine, and for extermination of microorganisms and removal from the air. The device includes a purifying chamber through which the air to be purified is arranged to flow. In the structurally grounded purifying chamber ionized air (1) is led to a water dust or vapor which can be oxidized with hydrogen peroxide (6) and by increasing the voltage level of the ionization to produce ozone and to be led further to high voltage operated ion blast tips (8) producing a continuous ion jet, which is directed onto collecting surfaces (9) and taking with it droplets, particulate materials and gaseous components connected to them. The volume of the air to be purified determines the shape and volume of the purifying device.

6 Claims, 1 Drawing Sheet

(56) References Cited

FOREIGN PATENT DOCUMENTS

| | | |
|---|---|---|
| EP | 1075872 | 2/2001 |
| FI | 116122 | 9/2005 |
| FI | 121165 | 8/2010 |
| GB | 556939 | 10/1943 |
| JP | 05044959 | 2/1993 |
| JP | 7057299 | 6/1995 |
| JP | 08298197 | 11/1996 |
| JP | 09000610 | 1/1997 |
| JP | 2005075234 | 3/2005 |
| JP | 2009233059 | 10/2009 |
| WO | 02085524 | 10/2002 |
| WO | 2005092510 | 10/2005 |

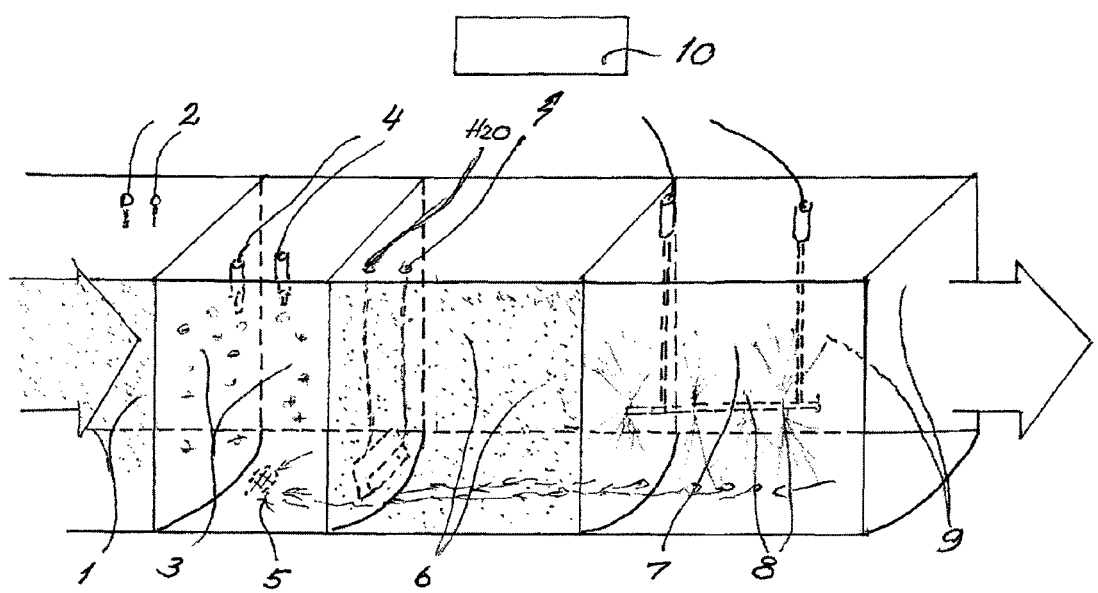

DEVICE AND METHOD FOR PURIFYING AIR FROM NON-DESIRED COMPONENTS AND FOR ELIMINATING SUCH COMPONENTS

This invention concerns a device for purifying air from non-desired gases, microorganisms, droplets, particles of nano size and larger, which device comprises a purifying chamber through which air to be purified is arranged to flow, said purifying chamber having a zone where the air to be purified is arranged to flow through water dust or water vapor, as well as an ion blast chamber having ion blast tips directed towards collecting surfaces, whereby droplets or particulate materials included in the air to be purified and flowing through ion jets rushing from said ion blast tips will be thrown against said collecting surfaces being grounded, and mass collected onto said collecting surfaces will flow down to the bottom of the purifying chamber and from there to drainage simultaneously as purified air will leave the purifying chamber.

The invention also concerns a method for purifying air from non-desired gases, microorganisms, droplets particles from nano size and bigger, which method comprises leading air to be purified through a zone of water dust or water vapor and then through an ion blast chamber, wherein droplets or particulate materials included in the air to be purified and fed through ion jets rushing from ion emitting tips will be thrown against grounded collecting surfaces, and mass collected onto said collecting surfaces will flow down to the bottom of the purifying chamber and from there to a drainage simultaneously as purified air is led out.

Practice and tests have shown that in addition to particles of a size bigger than one millimeter also particles of nano size and vapors can be separated by means of ion blast technique. Separation of odors and gases has been problematic in known methods. Air purifying solutions known per se, such as ion blast technique can be found in many Finnish and U.S. patents.

For instance in Document WO 2005/092510, corresponding to Finnish patent publication FI-116122 a device and a method known per se is disclosed for removing undesirable gases and particles from the air. At page 1, lines 32 to 33 of said document is mentioned that "Experiments have shown that odors can effectively be removed from air to be purified by means of the device and method according to the invention".

As another example a device and method for purifying air from non-desired gases and particles is disclosed in Finnish patent publication FI-121165. At page 2 lines 6 to 11 of the publication is mentioned, translated into English that characterizing for the device and method according to said invention is that a strong oxidizing zone for air is provided in the air inlet opening or in the inlet zone of the purifying chamber, whereby oxidizing is provided for instance by water dust containing hydrogen peroxide. In addition to removing of odors also extermination of microbes, such as viruses, bacteria, spores and other microorganisms, and removing of lifeless mass together with particle contamination onto the collection surfaces can be achieved by oxidizing However, strong and unpleasant odors pas through the device to some extent, and it is not always possible to use sufficiently strong oxidizing agents.

The object of the present invention is to eliminate also these drawbacks and to provide a device and a method by means of which also the odors can be separated effectively, without strong oxidizing. This object is achieved with a device and a method which are characterized in that in the inlet end of the purifying chamber there is an ionization chamber having ionization emitting tips for ionization of air coming to purification before it is led through the water dust or water vapor zone and in the inlet of the purifying chamber there are gas sensors being connected to an electricity and control centre of the purifying chamber, which based on signals from the gas sensors is arranged to determine an electric charge of the ionization, either negative or positive. Hereby a strong ionization of the air takes place in the inlet zone of the purifying chamber before the water dust zone and based on signals from the gas sensors the ionization can also be controlled to such a level of electric voltage, wherein ozone is generated to a desired level.

Water to be used for the water dust of the water dust zone can preferably be oxidized with hydrogen peroxide to intensify removal of gases and extermination of microbes. Due to very inexpensive price and very low operating costs of ionizers an effective removal of gases and extermination of microbes such as viruses, bacteria, spores and other microorganisms can be achieved already with low oxidation of the water dust. Based on the signals from the gas sensors in the inlet of the purifying chamber the electricity and control centre is also able to determine oxidation demand of the water dust in the water dust zone. The droplet size of water dust in the water dust zone is preferably smaller than 20 µm.

Instead of water dust also vapor having a temperature of for instance +200° C. can be used in the invention.

Experiments have shown that odors can effectively be separated from the air to be purified by the dev ice and the method according to the invention. Simultaneously particles of nano size and larger will be removed from the air almost to 100%.

According to a preferred embodiment air is ionized with either a negative or a positive charge before it is led into the purifying chamber. The electrically charged air is led to the water dust or water vapor into which hydrogen peroxide or another oxidizing agent can be mixed if necessary. A particle size of the water dust smaller than 20 µm is operatively most advantageous. High voltage operated tips in the purifying chamber creating the ion blast phenomenon produce a continuous jet of millions of ions onto the collecting surfaces, taking with it from the air to be purified particles of nano size and larger, droplets, microbes, other microorganisms and non-desired gases. Electric charging capability of aerosols is of no importance, so the method differs in this respect from electro filters. Droplets thrown onto the collecting surfaces are continuously cleaned away and pass from the collecting surfaces downwards towards drainage. The grounded collection surfaces can also be cleaned by means of water flush without interrupting the actual purifying operation.

Hydrogen peroxide having water as carrier is a generally used disinfectant in the world and is able to kill microbes and microorganism. The use of hydrogen peroxide is not associated with such problems as generation of gases or chemical residues, which will in using other oxidizing agents.

The invention will be described below by means of an Example with reference to the enclosed drawing, wherein FIG. 1 shows schematically one embodiment of an air purifying device according to the invention.

The air purifying device includes: incoming air 1 to be purified, and sensors 2 detecting different gases. An ionization chamber 3 into which the air to be purified is led, ionization emitting tips 4. Removal of water from all air treatment zones to drainage or a tank 5. Zone 6 is a water dust zone, into which water dust or oxidized water dust or water vapor is produced wherein the most preferable droplet size is smaller than 20 μm. An ion blast chamber 7 wherein ion jets from ion blast tips 8 are directed towards collecting surfaces are thrown onto grounded collecting surfaces 9. The bottom of the purifying chamber leads water to drainage 5. An electricity and control centre 10 comprises a voltage centre for the ionization according to control either by negative or positive voltage of preferably 10 kV to 36 kV, a high voltage centre of preferably 16 kV to 150 kV, for the ion blast, an electric current source for an ultra sound oscillator, or for other dust producing devices as well as a water feeding automate for a dust device.

The device and method according to the invention are suitable for applications where odors, gases, microbes and particles of nano size or larger transported by air are intended to be separated from the air. A great advantage of the method is the volume of the air to be purified, which can increase according to application. The method and device are suitable both for housing-specific air purification as for air purification of large spaces such as houses, hotels, official buildings or factories. The method is suitable for separation of radiating particles and gaseous iodine in air emissions from nuclear power plants resulting in a purification of almost 100% of these health-hazardous pollutions. The method is further very cost-effective; the energy consumption is low and the operation and maintenance costs are lower compared to fiber filtration methods.

The invention claimed is:

1. A device for purifying air from non-desired gases, microorganisms, droplets, particles of nano size and larger, which device comprises a purifying chamber through which air to be purified (1) is arranged to flow, said purifying chamber having a zone (6) where the air to be purified is arranged to flow through water dust or water vapor, as well as an ion blast chamber (7) having ion blast tips (8) directed towards collecting surfaces (9), whereby droplets or particulate materials included in the air to be purified and flowing through ion jets rushing from said ion blast tips (8) will be thrown against said collecting surfaces (9) being grounded, and mass collected onto said collecting surfaces will flow down to the bottom of the purifying chamber and from there to drainage (5)simultaneously as purified air will leave the purifying chamber, characterized in that in the inlet end of the purifying chamber there is an ionization chamber (3) having ionization emitting tips (4) for ionization of air (1) coming to purification before it is led through the water dust or water vapor zone (6) and in the inlet of the purifying chamber there are gas sensors (2) being connected to an electricity and control centre (10), which based on signals from the gas sensors is arranged to determine an electric charge of the ionization, either negative or positive.

2. The device according to claim 1, characterized in that the detecting sensors of the air to be purified (1) enable automatic control also of voltage in the ionization, whereby also an as high ozone generation as necessary is enabled.

3. The device according to claim 2, characterized in that the device removes gaseous iodine, carbon dioxide and ammoniac effectively from the air.

4. The device according to claim 2, characterized in that water used for the water dust of the water dust zone (6) is oxidized with hydrogen peroxide for intensifying removal of gases and extermination of microbes.

5. The device according to claim 4, characterized in that based on signals from the gas sensors the electricity and control center is arranged to determine oxidation demand of the water dust of the water dust zone (6).

6. The device according to claim 1, characterized in that the droplet size of the water dust in the water dust zone (6) is smaller than 20 μm.

* * * * *